US009905138B2

(12) United States Patent
Degenhardt et al.

(10) Patent No.: US 9,905,138 B2
(45) Date of Patent: Feb. 27, 2018

(54) MULTI-STATION SYSTEM OF MOTORIZED SKELETAL BONE MODELS FOR ASSESSING LANDMARK ASYMMETRIES

(71) Applicants: Brian Degenhardt, Ouray, CO (US); Kenneth Pamperin, Greentop, MO (US); Harry Jabs, Oakland, CA (US); Inder Raj Singh Makin, Mesa, AZ (US)

(72) Inventors: Brian Degenhardt, Ouray, CO (US); Kenneth Pamperin, Greentop, MO (US); Harry Jabs, Oakland, CA (US); Inder Raj Singh Makin, Mesa, AZ (US)

(73) Assignee: A.T. STILL UNIVERSITY OF HEALTH SCIENCES, Kirksville, MO (US)

( * ) Notice: Subject to any disclaimer, the term of this patent is extended or adjusted under 35 U.S.C. 154(b) by 809 days.

(21) Appl. No.: 14/212,643

(22) Filed: Mar. 14, 2014

(65) Prior Publication Data
US 2014/0295395 A1 Oct. 2, 2014

Related U.S. Application Data

(60) Provisional application No. 61/788,152, filed on Mar. 15, 2013.

(51) Int. Cl.
*G09B 23/32* (2006.01)
*G09B 23/30* (2006.01)

(52) U.S. Cl.
CPC ............ *G09B 23/32* (2013.01); *G09B 23/30* (2013.01)

(58) Field of Classification Search
CPC ........ G09B 23/30; G09B 23/32; G09B 23/34; G09B 23/281; G09B 23/288; A63B 22/02;
(Continued)

(56) References Cited

U.S. PATENT DOCUMENTS 7,014,471 B2 * 3/2006 Farenholtz ........... A63B 69/345
434/267
7,465,168 B2 12/2008 Allen et al.
(Continued)

FOREIGN PATENT DOCUMENTS

DE 102010056568 A1 7/2012
EP 1550401 A1 7/2005
(Continued)

OTHER PUBLICATIONS

PCT International Search Report and Written Opinion, PCT/US2014/028578, dated Jul. 23, 2014, 8 pages.

*Primary Examiner* — Timothy A Musselman
(74) *Attorney, Agent, or Firm* — Quarles & Brady LLP

(57) ABSTRACT

Paired bones are individually secured in an anatomically relevant manner onto independent, parallel positioned platforms, and configured into motorized models for the purpose of teaching and assessing clinicians' ability to identify and compare the relative positions of bony landmarks within the coronal and sagittal planes. One platform can be powered by two motors to generate precise landmark asymmetries, moving the platforms in the coronal plane and around a horizontal axis. As the platform shears upward or rotates forward, the landmarks on the bone attached to that platform can be moved superiorly compared to the other side. A central computer can instruct the motors of a plurality of models to move predetermined amounts via a two-way wireless communications link. The model can communicate back to the computer once the movement is completed, assuring a high level of precision in obtaining the intended positional asymmetry or informing the user that the move exceeds the limits of the model.

23 Claims, 8 Drawing Sheets

(58) Field of Classification Search
CPC ............ A63B 22/0228; A63B 22/0292; A63B 22/0046
USPC .................................................. 434/262, 374
See application file for complete search history.

(56) References Cited

U.S. PATENT DOCUMENTS

| | | | |
|---|---|---|---|
| 7,712,387 B2 | 5/2010 | Hwang et al. | |
| 8,145,440 B2 | 3/2012 | Nakamura et al. | |
| 8,439,688 B2 * | 5/2013 | Wilkins | G09B 23/28 434/262 |
| 2002/0014017 A1 | 2/2002 | Egan | |
| 2005/0219205 A1 | 10/2005 | Bailey et al. | |
| 2006/0073456 A1 | 4/2006 | Allen et al. | |
| 2006/0264965 A1 | 11/2006 | Shadduck et al. | |
| 2008/0227073 A1 * | 9/2008 | Bardsley | G09B 23/34 434/267 |
| 2010/0114103 A1 | 5/2010 | Harrison et al. | |
| 2011/0091855 A1 * | 4/2011 | Miyazaki | G09B 23/34 434/267 |
| 2011/0223573 A1 | 9/2011 | Miller et al. | |
| 2011/0269109 A2 | 11/2011 | Miyazaki | |

FOREIGN PATENT DOCUMENTS

| | | |
|---|---|---|
| WO | 2008009140 A1 | 1/2008 |
| WO | 2011046606 A1 | 4/2011 |

\* cited by examiner

MULTI-STATION SYSTEM OF MOTORIZED SKELETAL BONE MODELS FOR ASSESSING LANDMARK ASYMMETRIES

CROSS-REFERENCE TO RELATED APPLICATIONS

This application claims the benefit of U.S. Provisional Patent Application Ser. No. 61/788,152 filed on Mar. 15, 2013, which is incorporated herein by reference in its entirety.

TECHNICAL FIELD

This disclosure relates to models (apparatuses) and methods for teaching and determining competency of clinician's skills in assessing the relative position of bony landmarks of the skeleton.

BACKGROUND

There are several palpatory diagnostic and treatment methods that have been developed to evaluate characteristics of the musculoskeletal system. One method evaluates the relative position of bony protuberances within the cardinal planes, primarily the coronal and sagittal planes. This method can be used, for example, when evaluating lower body and lower limb musculoskeletal disorders, including osteo/rheumatoid arthritis, spinal cord and other central nervous system (CNS) disorders, CNS degenerative diseases, low back pain, pelvic pain, postural and gait abnormalities, and obstetrics-gynecological disorders. Literature indicates that this form of testing has been used for at least a century, but a system to objectively evaluate the accuracy of the performance of this type of testing has only recently been considered.

The pelvis is one example of a region of the body where these tests are routinely used by clinicians in several manual medicine disciplines, including osteopathic physicians, chiropractors, physical therapists, for example. Pelvic landmarks commonly evaluated are the iliac crests, the anterior superior iliac spine (ASIS), the posterior superior iliac spine (PSIS), the pubic tubercles and the ischial tuberosities.

Muscle contraction during walking and running has been shown to cause changes in the relative position of the pelvic bones and thus their associated landmarks. For over a century, anecdotal reporting has proposed that when the relative position of the pelvic bones becomes too asymmetric, the pelvic joints (sacroiliac joints and pubic symphysis) lose mobility so when muscles pull on them, compression of joint surfaces, abnormal movement characteristics, and pain often results. Manual interventions have been designed to diminish the asymmetry of these landmarks and improve pelvic bone movement characteristics, which anecdotally have been associated with improved function and pain reduction/resolution. Consequently this method of manual testing, evaluating positional asymmetry of landmarks, has both diagnostic and treatment outcome functions.

Evaluating the validity of landmark asymmetry testing has been challenged by the lack of a methodology to objectively measure landmark asymmetries. Direct determination of positional asymmetry of pelvic landmarks in living humans (in vivo), for example, does not exist at this time. There remains a need, therefore, for a system that allows accurate control of the relative position of bones that exhibit asymmetry, such as the pelvic bones, using models of the human pelvis. The system should allow for an objective and accurate assessment of asymmetry and provide feedback to students and practitioners performing positional asymmetry tests of the pelvis.

SUMMARY OF THE DISCLOSURE

In one aspect, the present disclosure provides a motorized model for assessing skeletal landmark asymmetries between corresponding opposing paired bones in a vertebrate. The motorized model comprises a bone including a skeletal landmark coupled to a stationary platform, and a corresponding opposing bone coupled to a moveable platform that is connected to a shear motor adapted to drive the moveable platform linearly relative to the stationary platform. A controller is in communication with the shear motor, and is programmed to receive asymmetry data from a user to provide a selected asymmetry between the bone and corresponding bone, and to drive the shear motor to provide the selected asymmetry for analysis of landmarks associated with the bone. The asymmetry between the bone and the corresponding bone can be evaluated for training purposes.

In one embodiment, the bone and the corresponding bone comprise a right and left hip bone, respectively, and the motorized model is calibrated to provide an anterior bone zero where corresponding landmarks of the left and right ASIS, the left and right iliac crest, and the left and right pubic tubercle sets on the first and second hips are aligned in the coronal plane. The bones can be coupled to the corresponding platform with the posterior side of the hip bone facing opposite the platform. The model can be calibrated to define a posterior bone zero in which the right and left iliac crest, right and left posterior superior iliac spine and the right and left ischial tuberosities are aligned in the coronal plane.

In another aspect, a system of motorized models for assessing skeletal landmark asymmetries in the corresponding bones of vertebrates is disclosed. The system includes a plurality of motorized bone models. Each of the motorized bone models comprises a stationary platform. A moveable platform is moveably coupled adjacent the stationary platform and to a shear motor and a rotational motor for linearly moving the moveable platform relative to the stationary platform and rotating the moveable platform relative to the stationary platform. One of a right bone and a left bone is coupled to the stationary platform, and the other of the right and left bones coupled to the moveable platform. A motor control is in communication with the shear motor and the rotational motor for driving the moveable platform to a selected position, and a model communications device in communication with the motor control for receiving commands for driving the shear and rotational motors. A central computer includes a user input device for receiving commands from a user for driving the moveable platform to a user selected asymmetry, and a central communications device in communication with the user input device for receiving commands from the user and the model communications device to provide commands to the motor control for driving the shear motor and the rotational motor. When the moveable platform is moved, an asymmetry is created between the right and left bones as selected by the user. The communications link between the central communications device and the corresponding model communication devices can be a wireless communications link.

In another aspect, the right and left bones can comprise a right and a left hip bone, respectively, and the model can be calibrated to define a posterior bone zero in which the right and left iliac crest, right and left posterior superior iliac spine and the right and left ischial tuberosities are aligned in the shear direction. Alternatively, the left and right bones can comprise a left and right hip bone, and the motorized model can be calibrated to provide an anterior bone zero where corresponding landmarks of the left and right ASIS, the left and right iliac crest, and the left and right pubic tubercle sets on the left and right hip bones are aligned in the shear direction.

In still another aspect, a method for emulating skeletal landmark asymmetry in a vertebrate for use in teaching evaluation of asymmetries is disclosed. The method comprises the steps of mounting one of a corresponding right and left bone to a stationary platform, mounting the other of the corresponding right and left bone to a moveable platform adapted to be driven in at least one of a shear and a rotational direction relative to the stationary platform, and moving the moveable platform to a home position, wherein landmarks corresponding to the right and left bone are aligned in the shear direction. The moveable platform can then be driven to a selected position defining an asymmetry, wherein the asymmetry can be evaluated by a medical practitioner for training purposes. The right and left bones can be corresponding pelvic bones. The anterior side of each of the right and left pelvic bones can be mounted opposing the corresponding stationary and moveable platforms, and the landmarks can be defined as an anterior bone zero aligned in the shear direction are the left and right ASIS, the left and right iliac crest, and the left and right pubic tubercle sets. Alternatively, posterior side of each of the right and left pelvic bones opposing the corresponding stationary and moveable platforms, and the landmarks aligned in the shear direction to define a posterior bone zero can be the right and left iliac crest, right and left posterior superior iliac spine and the right and left ischial tuberosities.

In still another aspect, a method for calibrating a motorized model for assessing skeletal landmark asymmetries in the corresponding bones of vertebrates is disclosed. The motorized model comprises right and left corresponding bone structures mounted to corresponding platforms, wherein at least one of the platforms is linearly or rotationally moveable relative to the other of the platforms through predetermined coordinates. The method includes the steps of marking at least one bony protuberance identifying a landmark, acquiring images of the marker at a plurality of the predetermined coordinates, and calculating the position of the marker in each of the acquired images in three dimensional space. A position of the moveable platform is then adjusted relative to the stationary platform through a plurality of predetermined positions. The calculations can be adjusted to account for a difference between a centroid of the marker and the position of the landmark, wherein the system can consistently reproduce asymmetries in the model. In one embodiment, the marker can be an infrared marker, and the images can be acquired using an infrared camera.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION

Figure 1:
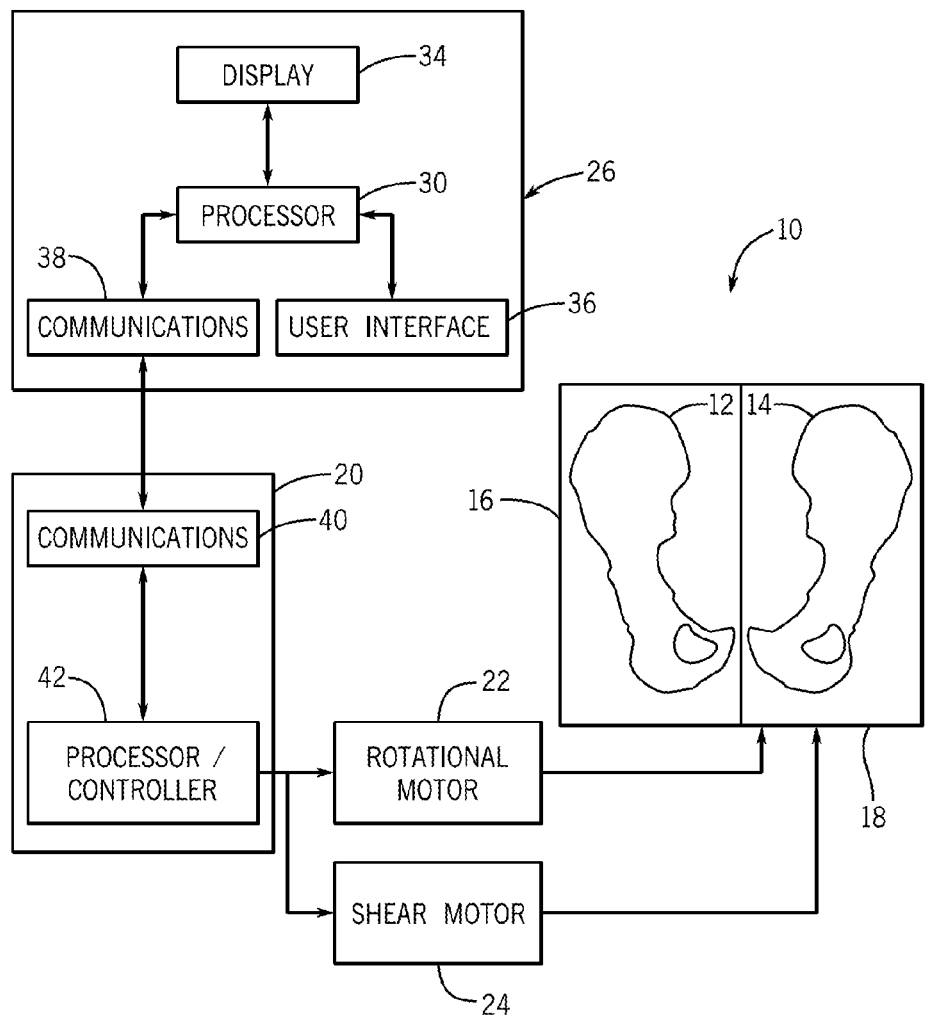
FIG. 1 is a block diagram of a motorized pelvic model system constructed in accordance with any combinations of the present invention.

Referring now to the Figures and more particularly to FIG. 1, a block diagram of a motorized bone model 10 for assessing landmark asymmetries is shown. As shown here, models of "paired bones," here a left hip bone 12 and a right hip bone 14, are coupled to a stationary (left) and movable (right) platform 16 and 18, respectively. A rotational motor 22 and a shear motor 24 are coupled to the moveable (right) platform 18 and receive commands from a motor controller 20 to drive the platform 18 linearly and rotationally relative to the left platform 16 to simulate asymmetries between the bones. Commands to the motor controller 20 can be provided from a remote computer 26 which can be, for example, controlled by an instructor teaching a student to evaluate asymmetries in the pelvis as described more fully below.

Referring still to FIG. 1, the remote computer 26 can be an off-the-shelf computing system including a processor 30 and corresponding memory (not shown), a display 34, and a user interface 36, which can be a keyboard, a touch screen incorporated as part of display 34, a mouse, or various other types of devices for receiving information from a user. The remote computer 26 communicates to the motor controller 20 through a communication device 38 which can provide a wired or wireless communication link to a corresponding communications device 40 in the controller 20. The communications are directed to a control board 42 in the motor controller 20, which can include a processor driving a transistor or other switching device to selectively apply power to the rotational and shear motors 22 and 24, as is known in the art. The motors 22 and 24 can be, for example, stepper motors, although servo motors or other types of motors capable of precise movement can also be used.

Figure 2:
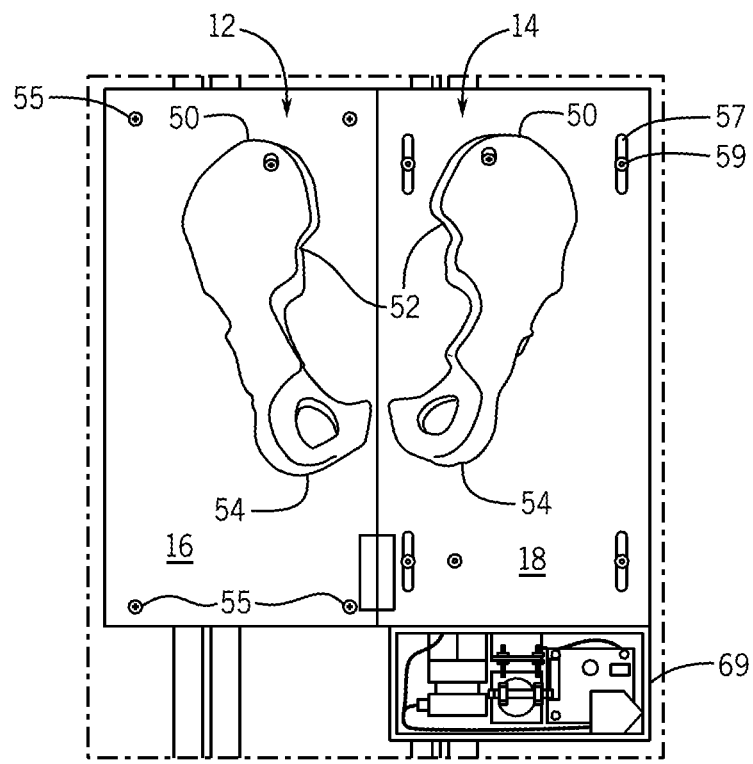
FIG. 2 is a top view of a motorized pelvic model with the anterior side of the pelvic bones coupled to a platform so the posterior pelvic landmarks can be assessed.
Figure 3:
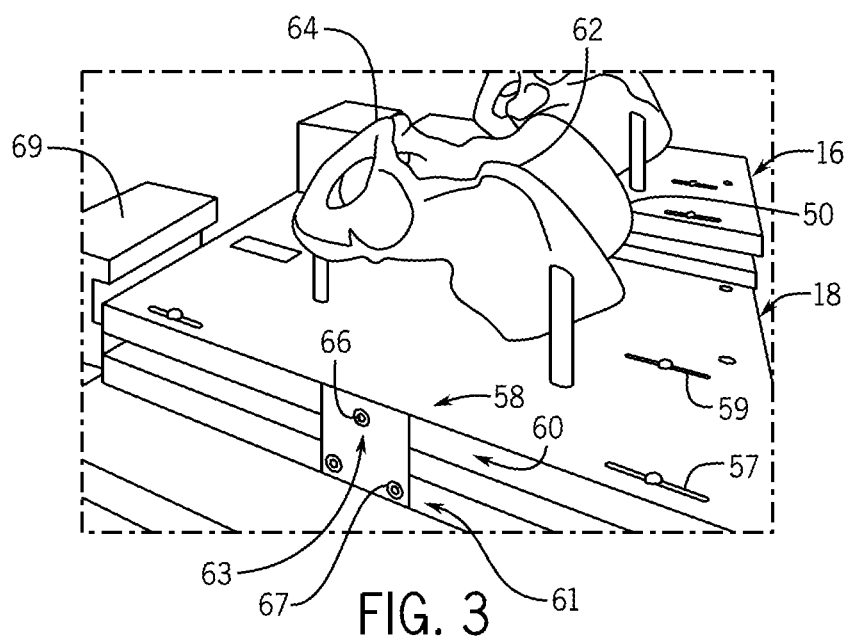
FIG. 3 is a perspective view of an alternate motorized pelvic model with the posterior side of the pelvic bones coupled to a platform so the anterior pelvic landmarks can be assessed.

Referring now to FIG. 2, a top view of one embodiment of the motorized model 10 is shown. The embodiment shown here is a posterior model, with the posterior side of the hip bones 12 and 14 exposed so that the relative positions of three landmarks, the iliac crest 50, PSIS 52 and the ischial tuberosities 54 can be palpated by a student or other clinician to determine the relative position of the landmarks on the right hip 12 as compared to the left hip 14. Referring now also to FIG. 3, an alternate anterior embodiment is shown. Here, the posterior sides of the hip bones 12 and 14 are coupled to the left and right platforms 16 and 18, respectively, with the anterior shown. This configuration allows an examiner to evaluate the landmarks on the anterior side of the pelvis, the iliac crest 50, the ASIS 62 (FIG. 3) and the pubic tubercles 64.

Referring still to FIGS. 2 and 3, the stationary left platform 16 can be fixed in position by fasteners such as screws, bolts or other devices 55. Referring now specifically to FIG. 3, the moveable right platform 18 comprises an upper plate 58 moveably secured to a rotatable top plate 60, which is rotationally mounted to a base plate 61. A support brace 63 secures the rotatable top plate 60 to the stationary base plate 61 at a predetermined height, which is selected to exceed the known amount of asymmetry of the landmarks in humans, here selected to allow for 3.5 degrees of motion in both directions from the flat, neutral position. The rotatable top plate 60 is coupled to the stationary base plate 61 through rotational bearing 66, described herein. The left platform 16 is preferably stationary, but can also include a similar construction (not shown) as described for the right platform 18.

Referring still to FIGS. 2 and 3, slots 57 are provided through the upper plate 58 to receive threaded fasteners 59 to secure the upper plate 58 to the base plate 60 while allowing the shear motor 24 to linearly drive the upper plate 58 to slide (shear) relative to the fixed right platform 18. The motor controller 20 can be provided in a control box 69, which can be mounted adjacent platform 16 and can contain the motors necessary for controlling precise movements of the right platform 18.

Figure 11:
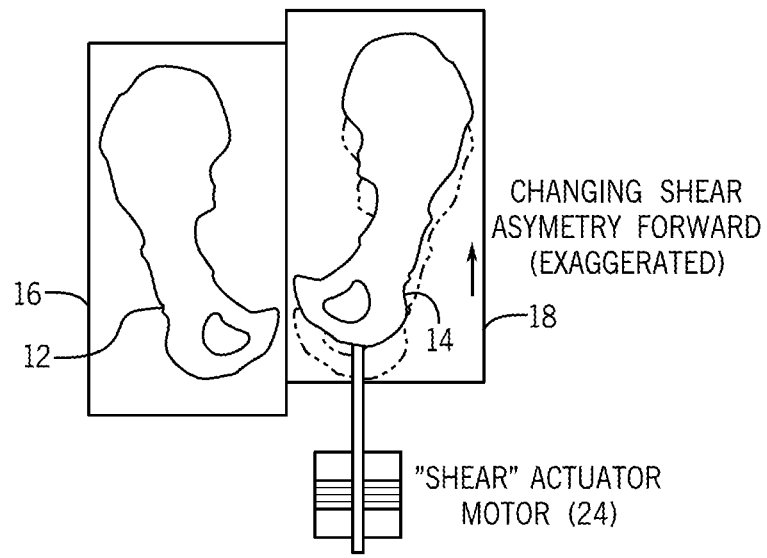
FIGS. 11 and 12 illustrate translatable motion of one hip relative to the other.
Figure 12:
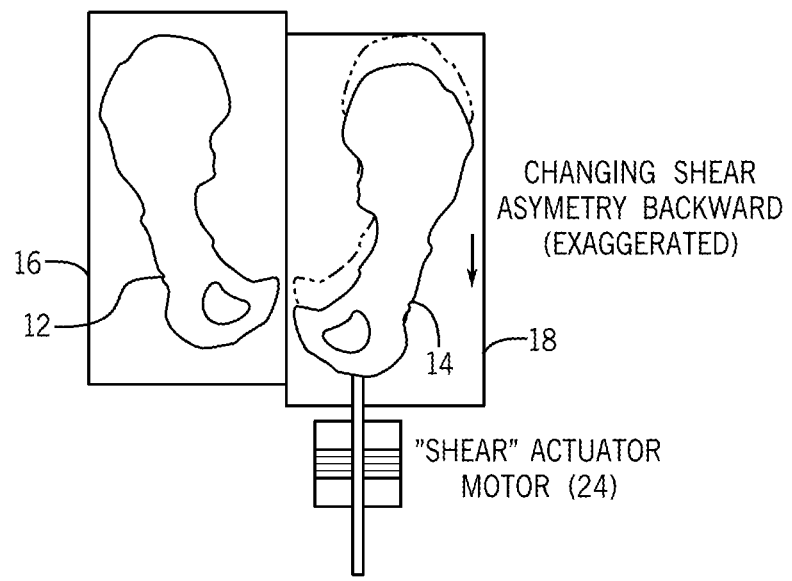
Figure 13:
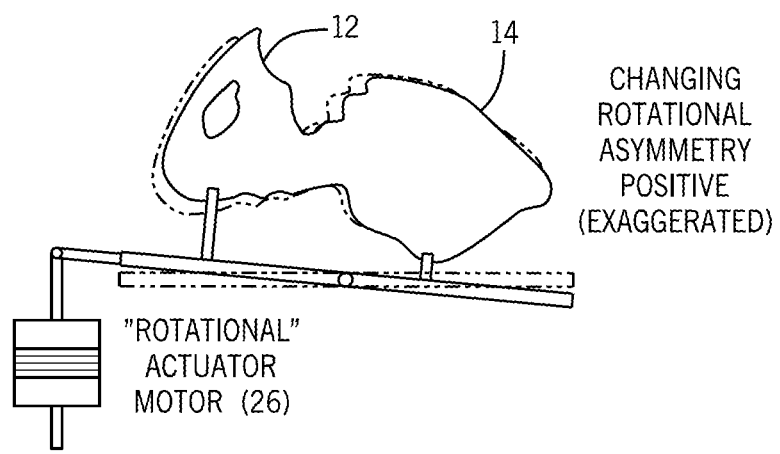
FIGS. 13 and 14 illustrate rotational motion of one hip relative to the other.
Figure 14:
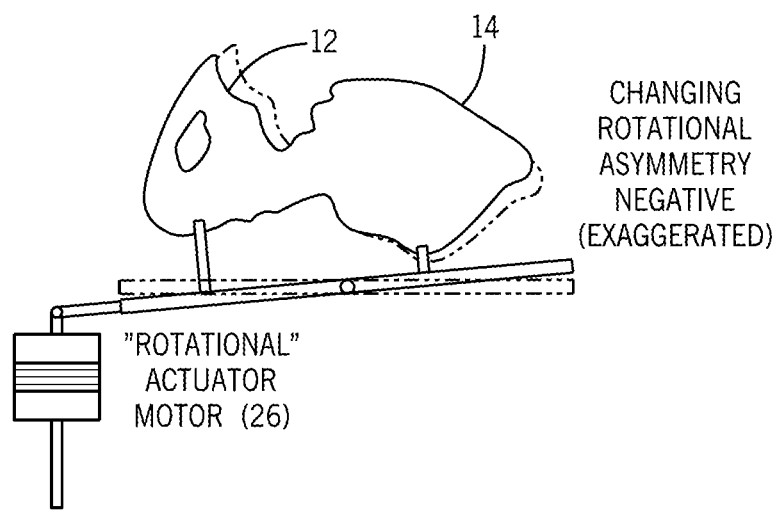

Although a number of different types of components and materials could be used, the upper plate 58 of platform 18 is preferably constructed of aluminum, and the hip bone 14 is coupled to the plate using metal anchoring posts and threaded fasteners such as screws or bolts. The stationary base plate 61 can comprise a solid piece of plasticized material, sized and dimensioned to be received within customized rails (132-FIG. 11) on tables, which keep the model immobile during testing. The rotatable top plate 60 can, similarly, be constructed of a plasticized material. The two plates 60 and 61 can be cut from a single piece of material into two suitably sized panels. Construction of the platform 16 (not shown) can be similar or identical to the dimension of the plate 60. The hip bones 12 and 14 can be made of plastic, fiberglass, or other materials, or actual bones.

Referring still to FIG. 3, the rotatable top plate 60 and base plate 61 can each comprise a recess sized and dimensioned to receive a support brace 63. Threaded fasteners 67 such as screws or bolts can be used to couple the support brace 63 to the base plate 61. A rotational bearing 66 couples the support brace 63 to the rotatable top plate 60 allowing rotation about the bearing 66, as described below.

Figure 4:
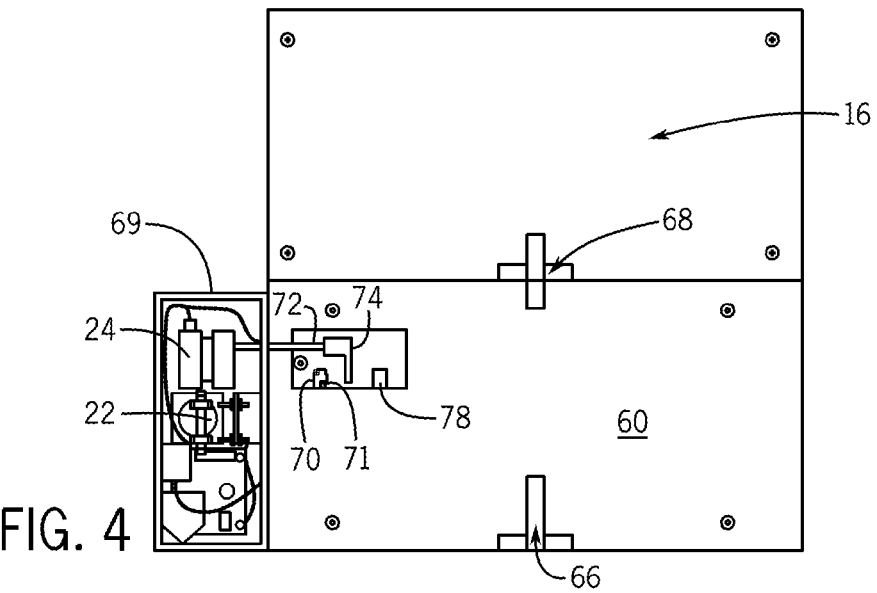
FIG. 4 is a top view of the platforms of FIGS. 2 and 3 with the translatable plate removed illustrating the rotational axis for a rotating top plate.

Referring now to FIG. 4, a bottom view of the rotatable top plate 60 with the translatable top plate removed is shown as coupled to the platform 16. As described above, rotational bearing 66 couples the rotational top plate 60 to support brace 63 (FIG. 3), while a second rotational bearing 68 couples the rotatable top plate 60 to platform 16. To improve rigidity and provide precision movement, the rotational bearings 66 and 68 can be fitted with a precision-ground shaft pin running in a sintered bronze sleeve bearing. The sleeve can be press-fitted into the top plate to assure rigidity in the material of the top plate. The outer diameter of the sleeve of 5/16" adds additional rigidity by better distributing force due to its larger diameter. Clearance between shaft and sleeve is approximately ±0.001" resulting in minimal, virtually undetectable free play. The free play is sufficiently small that it does not degrade movement. The outer bearing shaft can be bolted to the outer support member. This arrangement provides a strong bond between the shaft and the support member while allowing for easy assembly and disassembly. The bearing sleeve can be press-fit into the top plate and the threaded shaft inserted. The clearance between sleeve and shaft is ±0.001" making it snug to move with no detectable free play. The rotational motor 22 can include a linkage comprised of two pivot points.

Referring still to FIG. 4, the shear motor 24 is coupled to linear actuation mechanism 70 which can be, as shown, a lead screw 72 and corresponding end tab 74 recessed or milled into the rotatable top plate 60. End contact switches 71, 78 are secured to the translatable top plate 58 (FIG. 3) and designed to enable movement of ±12 mm from a pre-defined symmetric ("zero") point. At ±13 mm, the end tab 74 at the end of lead screw 72 will contact an end contact switch 71, 78 which provides a signal to the processor on controller 42 (FIG. 1) indicating the end of motion. The end of motion signal in turn triggers the controller 42 and communications device 40 to send a message to the communication device 38 in central computer 26 to notify the user that the end range of motion has been exceeded. The activation of the end contact switches 71, 78 can further be used by the motor controller 42 (FIG. 1) in motor controller 20 as a parameter for an automatic homing procedure to the pre-defined symmetric ("zero") point. Although a number of possible constructions exist, the depth of the recessed part of the top surface of the rotatable top plate 60 can be chosen to accommodate the lead screw 72, end tab 74 and end contact switches 71 and 78 and is preferably sufficiently shallow to limit weakness in the top plate 60 due to removal of excess material. The end switches 71 and 78 can deactivate the motor shortly before the physical limits of the axis are reached. The shear motor 24 can also include thrust bearings to eliminate axial play and prevent binding of the rotating armature at run time under load.

Because of the geometry of the stationary base plate 61 with respect to the rotating top plate 60, the linear actuator element (not shown) of stepper motor 24 driving the rotational axis with a lead screw (not shown) can be mounted with flexible linkages at the top and the bottom connection. The top linkage can be comprised of two ball joints that act as upper bearing and allow for a compact design keeping the vertical profile to a minimum by positioning the ball joint right and left of the lead screw 72. At the bottom a hinge joint serves as lower bearing permitting angular movement but preventing twisting of the linear actuator. Both bearings are precision devices with no detectable free play for a tight but flexible linkage between the linear actuator 70, the base plate 61 and the top plate 60.

The upper joint can comprise a ball joint in the form of rod ends which provide convenient and rigid attachment to an angle member rigidly attached to the rotatable top plate 60. A threaded precision-ground shaft can be used to facilitate a rigid attachment to the vertical lead screw in the form of a cross member. The threaded precision-ground shaft can be drilled out in the middle to accommodate the vertical lead screw. The same screws bolting the ball of the ball joint to the threaded shaft can be used to clamp the vertical lead screw firmly between them.

The lower bearing can comprise a conventional strap hinge modified with a sleeve bearing. To minimize free play and produce a precision joint a sleeve-and-shaft bearing can be used. The bearing can be comprised of two sleeves and one common shaft. The two loops of one half of the strap hinge have a diameter slightly less than the outer diameter of the bearing sleeves. The sleeves are press-fitted firmly into the loops for a tight and rigid attachment. The loops of the other half of the hinge are crimped to yield an inner diameter slightly less than the diameter of the precision-ground bearing shaft to again provide a tight and rigid press-fit. The thus modified hinge is a precision linkage without detectable free play. No axial movement of the sleeves or the shaft is possible since they are firmly press-fitted into the hinge loops.

Figure 5:
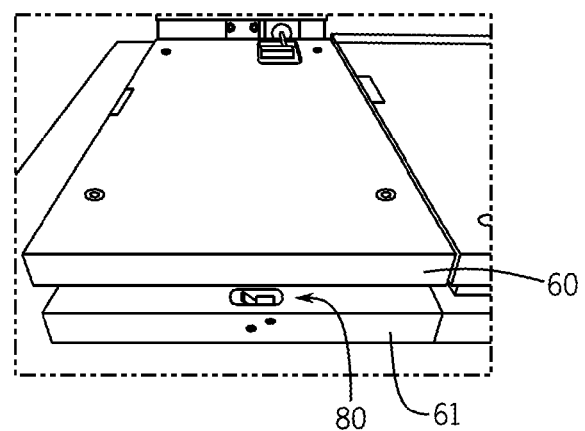
FIG. 5 is an image of the rotatable top plate with the translatable plate removed demonstrating an end contact switch regulating movement around the rotational axis.

Referring now to FIG. 5, a contact switch 80 is coupled to the top end of the base plate 61 and a corresponding contact switch (not shown) is coupled to the opposite end. These contact switches are activated when the rotatable top plate 60 rotates more than 3.5 degrees from a platform neutral position and provides an end of travel signal to controller 42. In summary, the end contact switches 71, 78, and 80 for linear and rotational motion serve as safety features as well as fix points for a homing procedure. Once a homing procedure is performed, the controller 42 can accurately assess and communicate the current position of the platform 18.

Referring again to FIGS. 3 and 4, the contents of the control box 69 includes motors 22 and 24 which can be stepper motors. As described above, the motors 22 and 24 are connected to lead screws 72 which can be precision-machined have near-zero backlash. The rotational motor 22 and corresponding lead screw are mounted with flexible linkages at the top and the bottom connection. The flexible linkages can be, for example, ball joints that act as upper bearing and a hinge joint that acts as lower bearing. These motor/lead screw complexes are perfectly accurate up to 0.25 mm. The stepper motors 22 and 24 were chosen due to their small size, low power consumption and low vibration. The controller can include a motor driver for driving each of the shear motor 22 and the rotational motor 24 and a microcontroller, which controls the stepper motor drivers. Power to the motors and digital circuits can be provided by an AC adapter supplying, for example, 2A of DC current at 12V. The housing enclosure of the control box 69 can be fabricated from a non-conducting material (ABS plastic) to allow free travel of radio waves without shielding effects.

Figure 6:
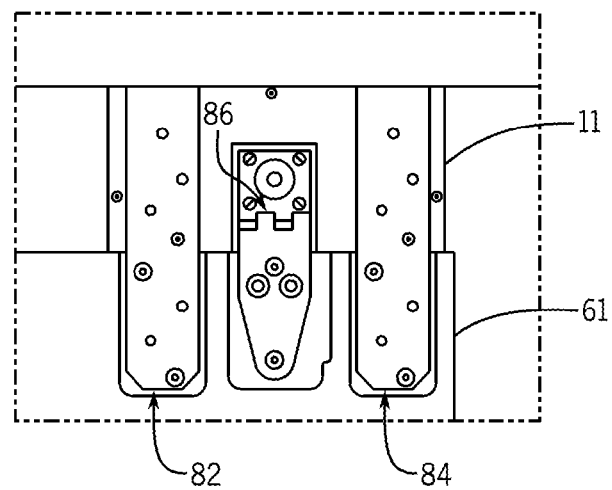
FIG. 6 is a bottom view of the stationary base plate demonstrating the bracing of a mechanical central box to the base plate and a lower hinge for the rotational axis actuator.

Referring now to FIG. 6, the control box 69 containing the motor controller 20, shear motor 24 and rotational motor 22 is shown coupled to the base plate 61. Cutouts in the base plate 61 receive bracing elements 82 and 84 which can be coupled to the base plate 61 and box 69 with mechanical fasteners such as screws, bolts or other coupling devices, and allow the control box 69 to be inlaid into the stationary base plate without affecting the slope of the bottom surface of the model 10. A hinge 86 couples the platform 18 to the box, and is positioned between braces 82 and 84 to provide a flexible support for the rotational motor 24 actuating the rotational axis.

Figure 7:
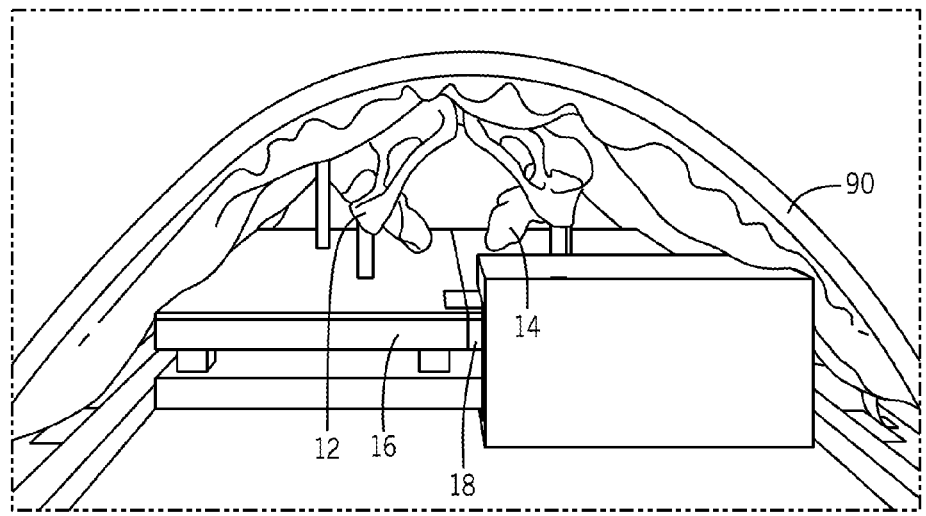
FIG. 7 is a side view from the inferior or "foot" of the motorized model, looking towards the "head" of the model, illustrating a covered model with the pliable material overlying the model.
Figure 8:
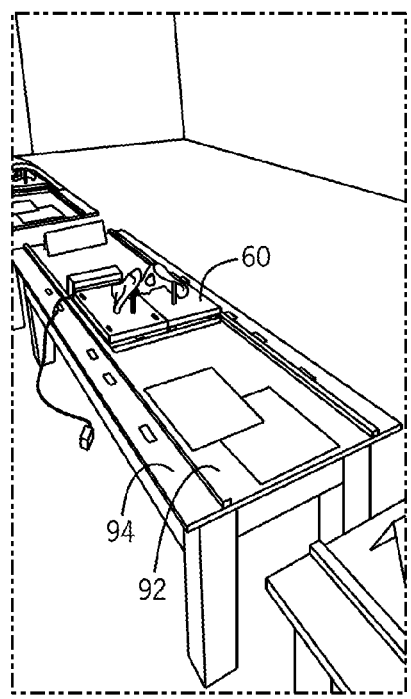
FIGS. 8a and 8b are a pair of images illustrating the examination procedures for one landmark on the motorized pelvic bone model.

Referring now to FIGS. 7 and 8 the hip bones 12 and 14 of the motorized pelvic bone model 10 can be covered with a foam pad and fabric 90 or other material selected to simulate soft tissue and skin. The model 10 can be secured on an exam table 92 by coupling the model between rails 94 to keep the model from sliding in any direction. The rails provide a guide that prevents lateral movement of the base while the student exerts pressure, and no hardware extends beyond the left or right sides. Because the model 10 is placed flat on the table between the rails 94 no hardware extends below the bottom of the base plate.

Figure 9:
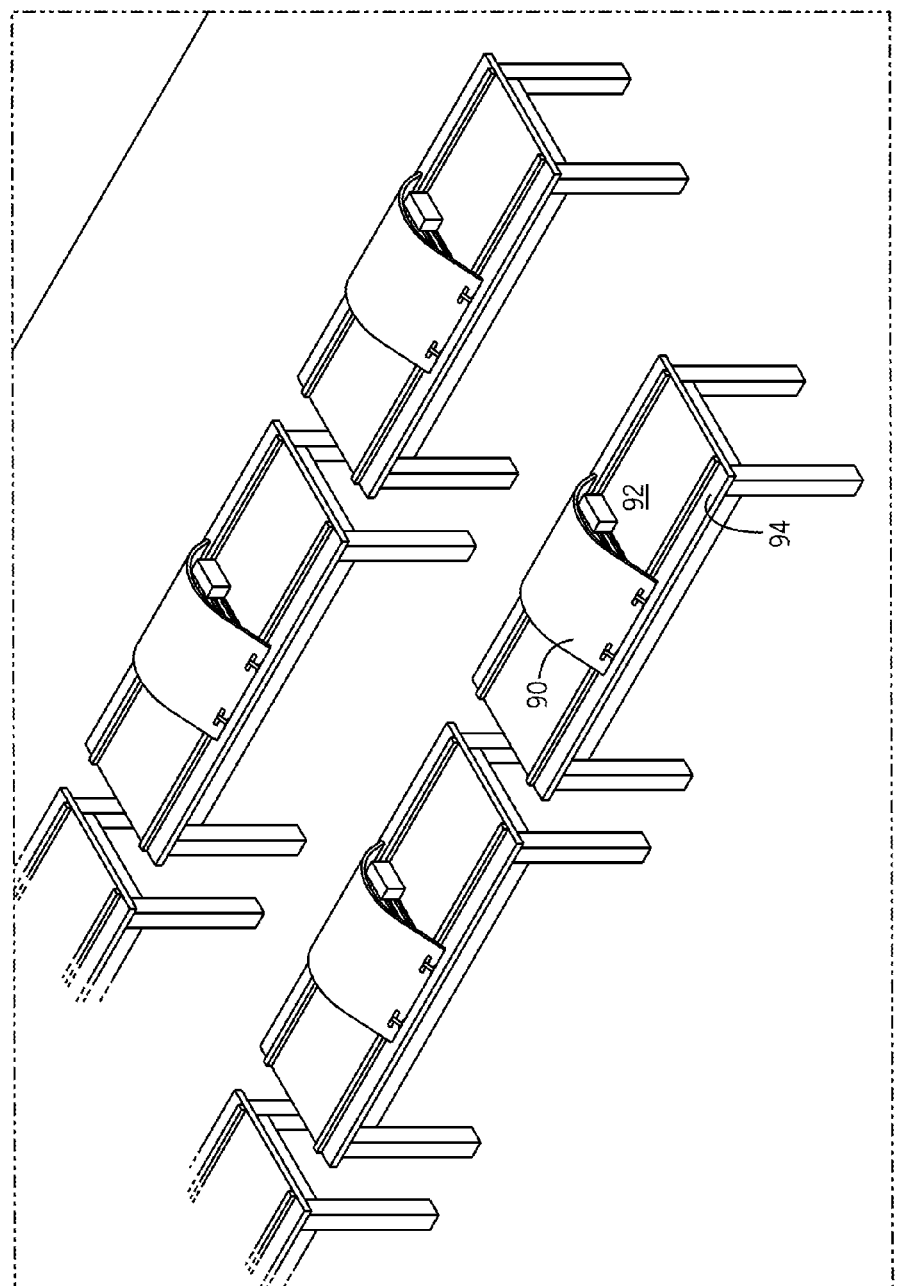
FIG. 9 is a perspective view of a multi-station system of motorized pelvic bone models with a plurality of models controlled by a central computer.

Referring again to FIG. 1, and now also to FIG. 9 in operation, a plurality of motorized models 10 are in communication with remote computer 26. The communication between communication device 38 in remote computer 26 and communication device 40 in motor controller 20 are preferably wireless, and allow for telemetry communication between the central computer 26 and the motor controller 20 in a corresponding motorized model 10 over a distance of at least 100 ft. The communication device 40 in each motorized model 10 can be configured as a network end point. Alternatively, wired communication, such as a direct cable connection between the central computer 26 and a model 10 can be provided.

The remote computer 26 communicates to each of the motorized models 10 through communications device 38 and corresponding communication device 40. In one embodiment, for example, the remote computer 26 comprises a node in a star-configured network that conforms to the international IEEE 802.15.4 standard. In this configuration the communications device 38 can comprise a coordinator radio that can establish a two-way communication with the communications device 40 in each motorized model 10. Communications can be provided through a universal serial bus (USB) port on the computer 26. The communications device 40 on each of the motorized pelvic models 10 can include a "router" radio. Each such "router" radio may communicate with the "coordinator" radio connected to the computer 26 in a network. The motorized models 10 typically do not communicate directly with each other. Although a number of different ranges is possible, in one embodiment, a range of wireless communication of 100 feet indoor/urban range and a minimum of 200 feet outdoor/RF line-of-sight between the central computer and any motorized model was found suitable for the application.

Referring again to FIG. 1, the display 34 and user interface 36 of the computer 26 allow an operator, such as an instructor, to enter end range parameters of the moveable aluminum plate and rotatable top plate, and to input the desired asymmetry setting for the specific landmark. The remote computer 26 informs the operator when the movements have completed or exceeded the designated range of movement. A separate set of criteria can be established for each motorized model 10 and these can be provided on separate tabs in the instruction.

Once the wireless connection has been established between the remote computer 26 and the motorized models 10, each model 10 can be provided instructions individually. Initially, and prior to use, the remote computer identifies and logs a home position or neutral position for the motorized pelvic model 10, within the coronal plane, and the end limits of the shear range. To calibrate the home position, the user directs the translatable top plate 58 to move to the extreme negative shear limit, identified by the activation of the end contact switch. This position is logged by the firmware, and the translatable top plate 58 is reversed toward the positive shear limit for a pre-determined distance, approximately half-way between the shear limits. This position is designated as shear home position to which all subsequent shear movements are referenced such that the firmware can infer at all times the actual shear position. This process is repeated for the rotational motion. The platform motor is instructed to rotate the rotatable top plate to the extreme negative position, identified by the activation of the end contact switch. This position is logged by the firmware and the rotatable top plate is reversed toward the positive rotational limit for a pre-determined angle, approximately half-way between the rotational limits. This position is designated as rotational home position to which all subsequent rotational movements are referenced such that the firmware can infer at all times the actual rotational position.

For proper comparison and alignment of motorized models 10, a "bone zero" is logged for each landmark. "Bone zero" defines the platform position where the asymmetry for a particular landmark has zero rotation and shear space. The definition of bone zero is the measurement of shear that is recorded when the rotation is zero, and the shear is adjusted such that the pair of landmarks are exactly even in the coronal plane, as determined by an overhead laser beam that is projected vertically from directly above the model onto the model itself.

On the anterior pelvic model, there is a bone zero for the left and right ASIS, the left and right iliac crest, and the left and right pubic tubercle sets. For example, when the shear is set to 3 mm, the ASIS landmarks are symmetrical within the coronal plane, while the Pubic tubercles may be symmetrical at a shear of −2 mm, and the iliac crests may be symmetrical at a shear setting of 6 mm. For the posterior pelvic models bone zero is evaluated for the Iliac Crest, Posterior Superior Iliac Spine (PSIS), and Ischial Tuberosity landmarks.

To establish "bone zero," infrared markers are then placed on each of the landmarks for a calibration process. An infrared camera system is used to identify the location of each infrared marker in three dimensions as the remote computer 26 commands the motor controller 20 for each model 10 to move to a number of predetermined positions along both the coronal plane and around the rotational axes. After the images are acquired, the location in three dimensional space of each of the infrared markers and corresponding landmarks is calculated at each of the predetermined settings along the axes. Due to the fact that the camera system measures 3D landmark locations using the centroid of the infrared marker (which can be, for example, about 3 mm away from the mark on the bones used to locate the bone zero settings), the remote controller adjusts the actual location of the landmarks based upon the bone zero vs. the centroid calculations.

Once bone zero has been identified for all relevant markers on the models, the platforms are returned to home position (0) and the movable plate is sheared +/−1, 2, and 3 mm in the coronal plane, and +/−1, 2, and 3 degrees around both directions of the rotational axis, to begin calibration and setting standardization process for testing purposes. Three different calibration trials with 40 different combinations of shear and rotational settings can be performed to assure accurate and reproducible identification of asymmetries for each landmark. The +/−1, 2, and 3 mm can be located at positions equidistant along the coronal plane, with +causing shearing movement in the cephalad direction in relation to the model's anatomy and −causing shearing movement in the pedal direction related to the model's anatomy. Similarly, the rotation adjustments are designated as 0 (a home position) and +/−1, 2, and 3 degree increments. Here, the increments are positioned around the rotational axis from the home position to the end of motion, with the positive rotation adjustments resulting in positive z displacements of the landmarks, and the negative rotation adjustments resulting in negative z displacements of the landmarks. In this embodiment, each round of calibration consists of the following 40 settings: S0, R0; S0, R1; S0, R2; S0, R3; S0, R-1; S0, R-2; S0, R-3; S1, R0; S1, R1; S1, R2; S1, R3; S1, R-1; S1, R-2; S1, R-3; S2, R0; S2, R1; S2, R2; S2, R3; S2, R-1; S2, R-2; S2, R-3; S3, R0; S-1, R0; S-1, R1; S-1, R2; S-1, R3; S-1, R-1; S-1, R-2; S-1, R-3; S-2, R0; S-2, R1; S-2, R2; S-2, R3; S-2, R-1; S-2, R-2; S-2, R-3; and S-3, R0.

During the calibration process, three trials are run for each setting. The remote computer 26 calculates the bone zero settings by using the data from the infrared position capturing camera system to determine the actual asymmetries between the left and right landmarks at the full array of settings that are tested during the calibration process. Specifically, as the model is moved through these 40 different settings, the remote computer 26 uses adjustment between the actual landmarks and the centroids of the markers to calculate the actual asymmetries at these 40 different settings. Although a number of infrared, position capturing cameras are available, in one embodiment of the invention, the 3D camera system was a T10 series camera manufactured by VICON, Hauppauge, N.Y.

Figure 10:
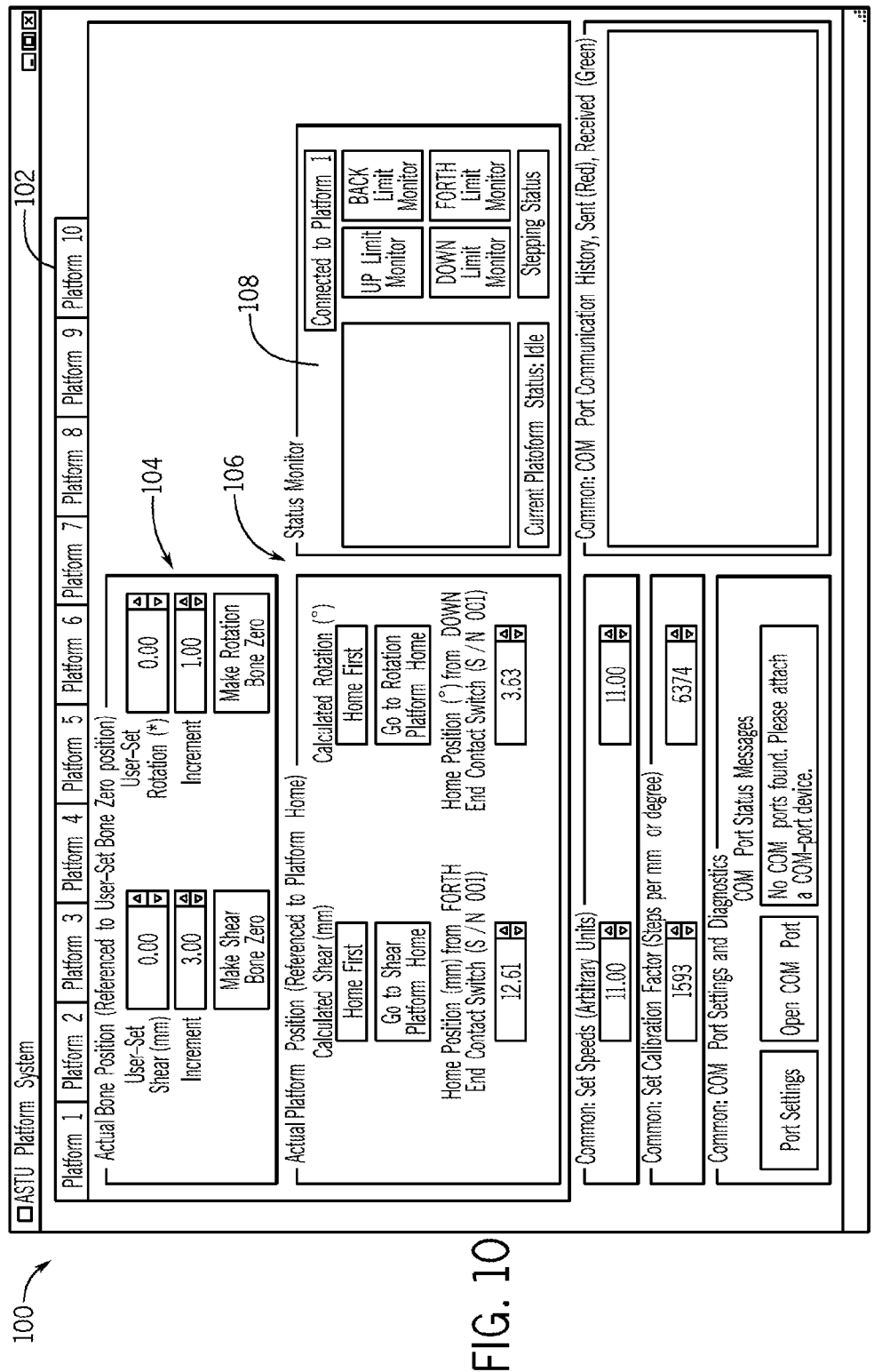
FIG. 10 is an illustration of a screen provided on a display of the central computer to wirelessly connect with the satellite models and control their movements.

Referring now to FIG. 10, an exemplary display screen 100 that can be provided on display 34 at remote computer 26 is shown. The display screen 100 provides tabs 102 allowing a user to access controls for each of a number of motorized models 10. Here, tabs 102 are shown providing access to ten separate motorized models 10, although this number can be varied. For each model 10, the display can include a window 104 for the user to enter commands to position the motorized model 10 relative to the "bone zero" position and a window 106 to position the motorized model 10 relative to the home position, allowing the user to enter landmark asymmetry settings for both the shear or coronal plane as well as degree of rotation. If the positioning exceeds the limits of model 10, the firmware will stop the motors immediately and raise a warning flag. The warning flag can indicate to the user that a limit has been exceeded, that only a fraction of the instructed movement could be completed and what the current actual position is.

Referring now to FIGS. 11 through 14, in operation, when the shear motor 24 is actuated the hip bone 14 coupled to moveable platform 18 is driven linearly resulting in a linear offset, and therefore a shear asymmetry between the hip bones 12 and 14. The translational axis is actuated by sliding the upper plate 58 of the moveable platform back and forth on the rotatable top plate 60. After any movement, the new position is communicated to the computer 26. The sliding upper plate 58 is restricted to linear motion only by guides.

Similarly when the rotational motor 24 is rotated the moveable platform 18 and hip bone 14 are rotated relative to the position of the stationary platform 16 and hip bone 12, resulting in a rotational asymmetry. The platform 18 can be preferably moved precisely at 0.01 mm increments up to ±12 mm of asymmetry in the coronal plane and at least ±3 degrees of rotation from neutral position with precision about 0.01 degrees. As the platform moves a predetermined amount, the associated hip landmarks also move. In one embodiment, the accuracy of the translational movement with the infrared camera system was shown to be better than 0.25 mm and the accuracy of repeating rotational movement was shown to be less than 0.1 degrees. The range of motion that can be generated is beyond the range of normal and abnormal positional asymmetries of the landmarks found in the human pelvis, and the bones can be positioned with a level of precision beyond what human examiners are typically able to differentiate. Consequently this system can fully evaluate the accuracy of students or clinicians performing this form of testing.

The operator of computer 26 can be, as discussed above, an instructor selecting a level of asymmetry for student medical practitioners. The instructor selects an asymmetry and drives the motorized model 10 to provide the selected asymmetry. The students are asked to provide an assessment of the asymmetry, which can be used to evaluate the students' skills and to train the students to properly evaluate asymmetry.

It should be understood that the methods and apparatuses described above are only exemplary and do not limit the scope of the invention, and that various modifications could be made by those skilled in the art that would fall within the scope of the invention. For example, although a specific platform configuration including one stationary and one moveable platform is described, either the right or left platform can be moveable, or both platforms can be linearly or rotationally moveable, or both. In addition, the bones used in the models can be actual bones, or bones constructed from plastic, plaster, or other types of materials. Although specific sets of paired bones are shown and described, corresponding paired bones from the body of a human or other vertebrate that include skeletal landmarks can be similarly mounted and evaluated as described above. To apprise the public of the scope of this invention, the following claims are made:

The invention claimed is:

1. A motorized model for assessing skeletal landmark asymmetries between opposing paired bones in a vertebrate, the motorized model comprising:
   a bone including a skeletal landmark coupled to a stationary platform;
   a corresponding opposing bone coupled to a moveable platform, the moveable platform operably connected to at least one of a shear motor and a rotational motor, the motor adapted to drive the moveable platform relative to the stationary platform to induce asymmetry between the paired bones;
   a controller in communication with the motor, the controller programmed to receive asymmetry data from a user to provide a selected asymmetry between the bone and corresponding bone, and to drive the motor to provide the selected asymmetry for analysis of landmarks associated with the hip bone, wherein the asymmetry between the bone and the paired bone is capable of evaluation.

2. The motorized model as recited in claim 1, wherein the controller is further in communication with a remote computer, the remote computer comprising a user interface for receiving asymmetry data from a user.

3. The motorized model as recited in claim 2, wherein the remote computer comprises a communications device and the controller includes a corresponding communications device for wireless communications between the remote computer and the motorized model.

4. The motorized model as recited in claim 2, further comprising a plurality of additional motorized models and wherein the remote computer is in communication with each of the motorized model and the additional motorized models and is adapted to provide commands to adjust the models to provide an asymmetry of the hip bones on each of the motorized model and additional motorized models.

5. The motorized model as recited in claim 1, wherein the first and second platforms are sized and dimensioned to be received in a guide to prevent lateral movement when accessed by a student.

6. The motorized model as recited in claim 1, wherein each of the bones is coupled to the corresponding platform with the anterior side of the bone facing opposite the platform.

7. The motorized model as recited in claim 6, wherein the bone and the corresponding bone comprise a right and left hip bone, respectively, and the motorized model is calibrated to provide align landmarks of the left and right ASIS, the left and right iliac crest, and the left and right pubic tubercle sets on the right and left hips in the coronal plane.

8. The motorized model as recited in claim 1, wherein each of the bones is coupled to the corresponding platform with the posterior side of the hip bone facing opposite the platform.

9. The motorized model as recited in claim 8, wherein the bone and the corresponding bone comprise a right and left hip bone, respectively, and the model is calibrated to align the right and left iliac crest, right and left posterior superior iliac spine and the right and left ischial tuberosities in the coronal plane.

10. The motorized model as recited in claim 1, further comprising a material selected to simulate soft tissue and skin.

11. The motorized model of claim 10, wherein the material selected to simulate soft tissue and skin comprises a foam.

12. A system of motorized bone models for assessing skeletal landmark asymmetries in the corresponding bones of vertebrates, the system comprising:
    a plurality of motorized bone models, each of the motorized bone models comprising:
      a stationary platform;
      a moveable platform adjacent the stationary platform, the moveable platform coupled to at least one of a shear motor and a rotational motor for moving the moveable platform relative to the stationary platform to induce asymmetry between the bone and the corresponding bone;
      a right bone and a corresponding left bone, one of the right and left bone coupled to the stationary platform and the other of the right and left hip bones coupled to the moveable platform;
      a motor control in communication with the shear motor and the rotational motor for driving the moveable platform to a selected position; and
      a model communications device in communication with the motor control for receiving commands for driving the shear and rotational motors;
    a central computer comprising:
      a user input device for receiving commands from a user for driving the moveable platform to a user selected asymmetry;
      a central communications device in communication with the user input device for receiving commands from the user and the model communications device to provide commands to the motor control for driving the shear motor and the rotational motor, wherein when the moveable platform is moved, an asymmetry is created between the right and left bones as selected by the user.

13. The system as recited in claim 12, wherein the communications link between the central communications device and the corresponding model communication devices is a wireless communications link.

14. The system as recited in claim 13, wherein the wireless communications link conforms to the international IEEE 802.15.4 standard.

15. The system as recited in claim 12, wherein an anterior side of each of the right and left bones is coupled to the respective stationary and moveable plates.

16. The system as recited in claim 15, wherein the right and left bones comprise a right and a left hip bone, respectively, and the model is calibrated to define a posterior bone zero in which the right and left iliac crest, right and left posterior superior iliac spine and the right and left ischial tuberosities are aligned in the shear direction.

17. The system as recited in claim 12, wherein a posterior side of each of the right and left bones is coupled to the respective stationary and moveable plates.

18. The system as recited in claim 17, wherein the left and right bones comprise a left and right hip bone, and the motorized model is calibrated to provide an anterior bone zero where corresponding landmarks of the left and right ASIS, the left and right iliac crest, and the left and right pubic tubercle sets on the left and right hip bones are aligned in the shear direction.

19. The system as recited in claim 12, further comprising a display coupled to the user interface, the display providing access to a user to select between the plurality of motorized models and to select an asymmetry for each.

20. The system as recited in claim 12, wherein the central computer further comprises a display in communication with the user input device and the central communications device, and wherein the central computer is programmed to receive commands from an instructor to drive the motorized models to a selected asymmetry wherein a student medical practitioner can evaluate the asymmetry.

21. A method for emulating a skeletal landmark asymmetry in a vertebrate for use in teaching evaluation of asymmetries, the method comprising the following steps:

mounting one of a corresponding right and left bone including a skeletal landmark to a stationary platform;

mounting the other of the corresponding right and left bone to a moveable platform adapted to be driven in at least one of a shear and a rotational direction relative to the stationary platform;

moving the moveable platform to a home position, wherein the skeletal landmarks corresponding to the right and left bones are aligned in the shear direction; and driving the moveable platform to a selected position defining a skeletal asymmetry, wherein the asymmetry can be evaluated for training purposes.

22. The method as recited in claim 21, wherein the right and left bones are corresponding pelvic bones, and further comprising the step of mounting an anterior side of each of the right and left pelvic bones opposing the corresponding stationary and moveable platforms, and wherein the landmarks defining an anterior bone zero aligned in the shear direction are the left and right ASIS, the left and right iliac crest, and the left and right pubic tubercle sets.

23. The method as recited in claim 21, wherein the right and left bones are corresponding pelvic bones, and further comprising the step of mounting a posterior side of each of the right and left pelvic bones opposing the corresponding stationary and moveable platforms, and wherein the landmarks aligned in the shear direction to define a posterior bone zero are the right and left iliac crest, right and left posterior superior iliac spine and the right and left ischial tuberosities.

* * * * *